June 16, 1953 — C. B. RICHEY — 2,641,895
CROP STRIPPER FOR ROTARY RAKES
Filed Dec. 31, 1949 — 4 Sheets-Sheet 1
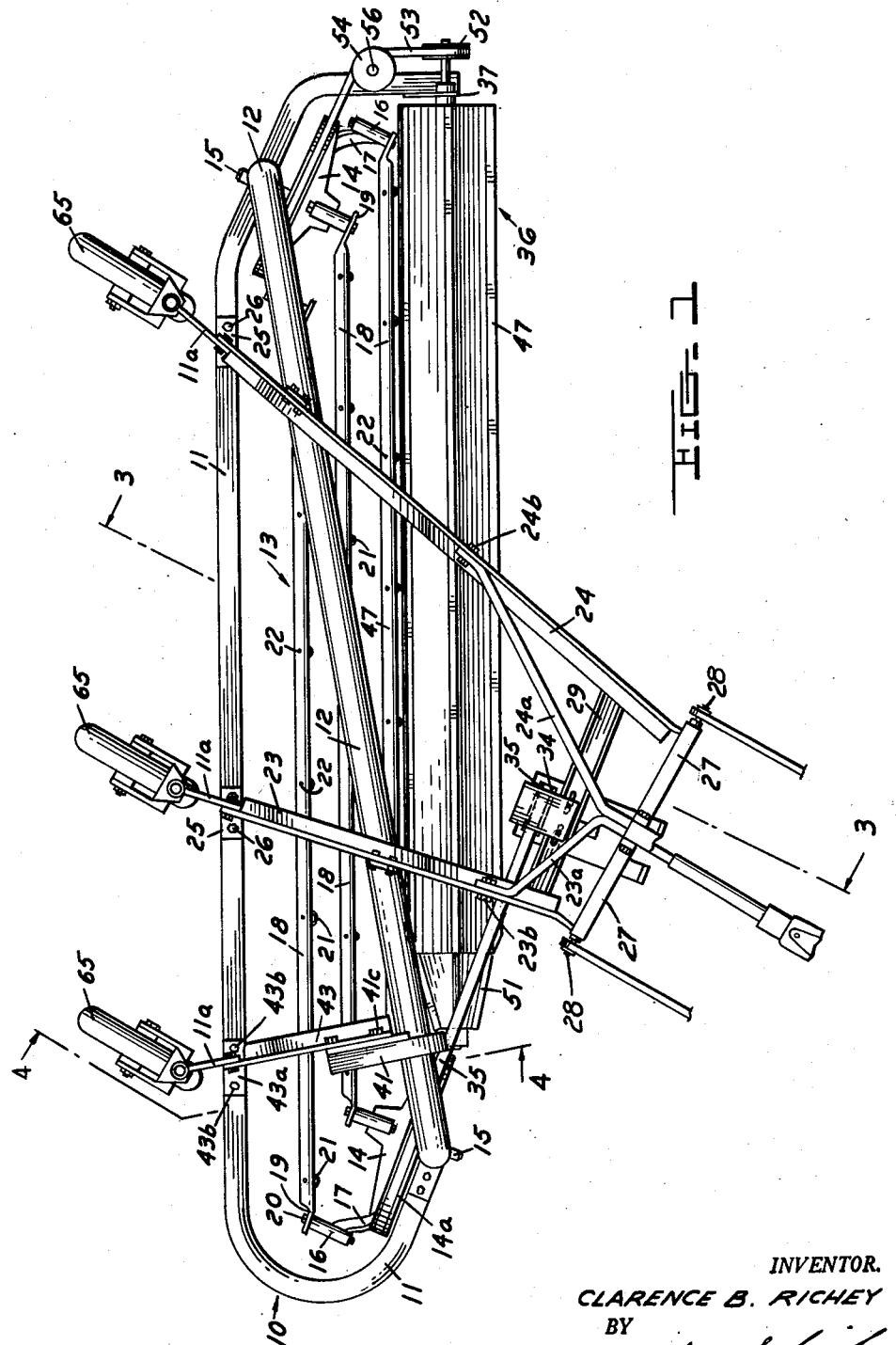
INVENTOR.
CLARENCE B. RICHEY
BY
*W. A. Schaich*
ATTORNEY

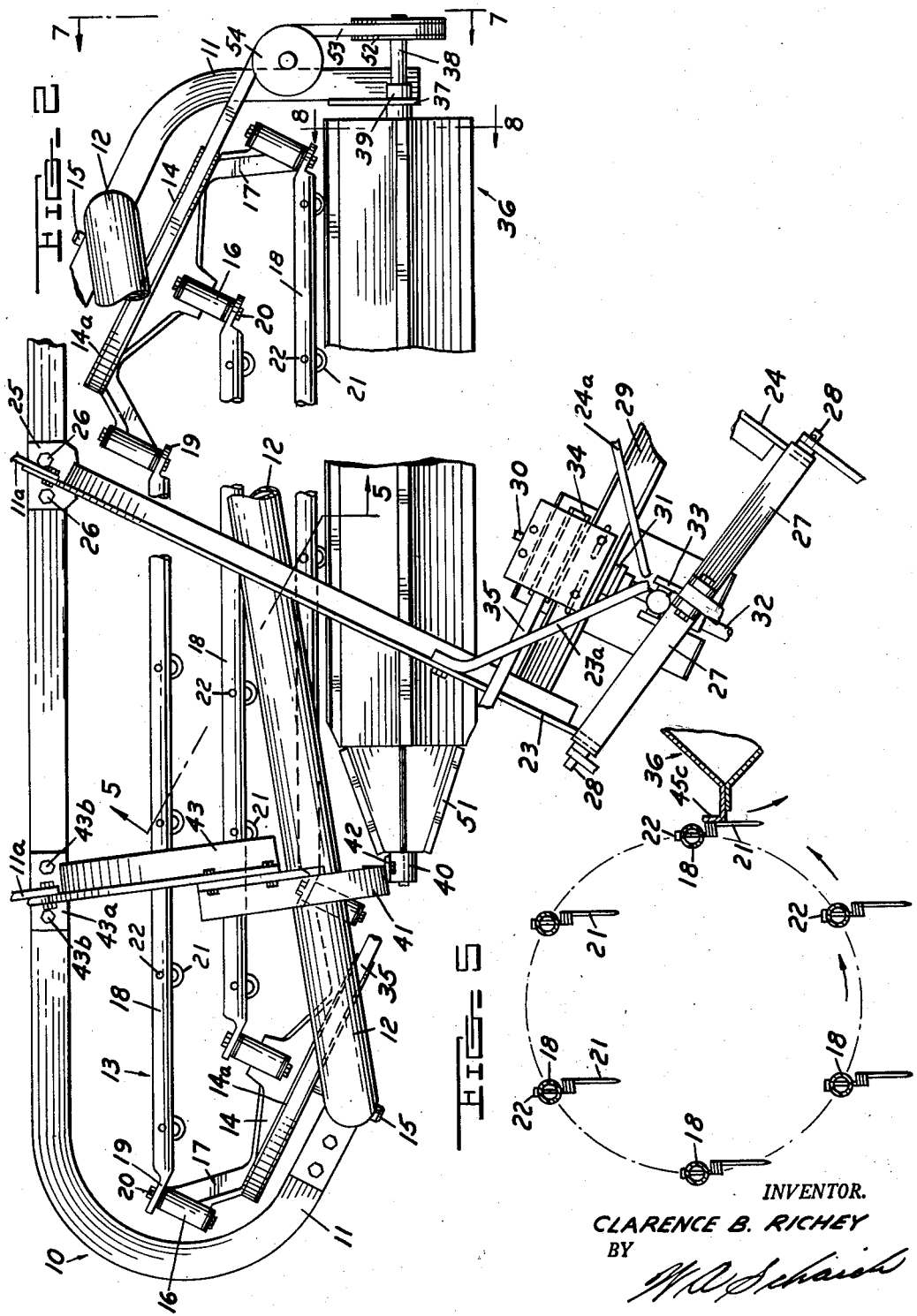

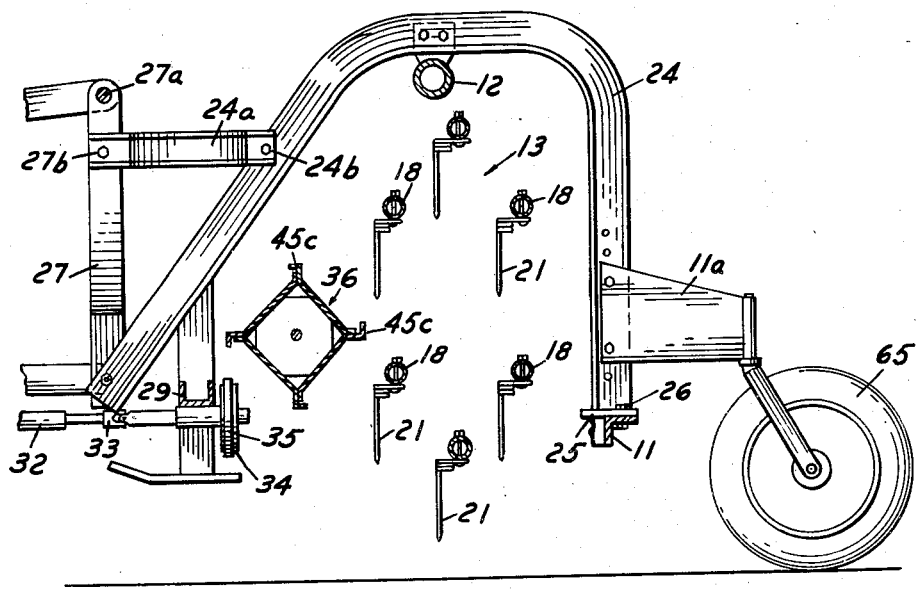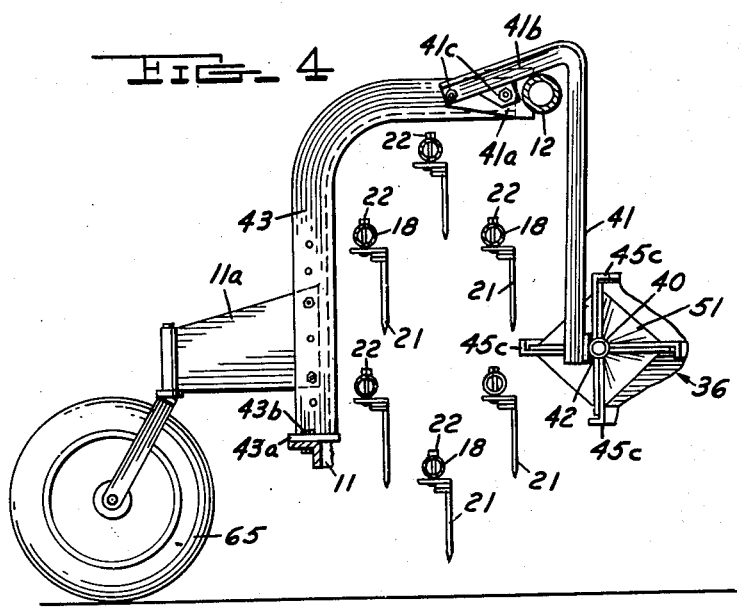

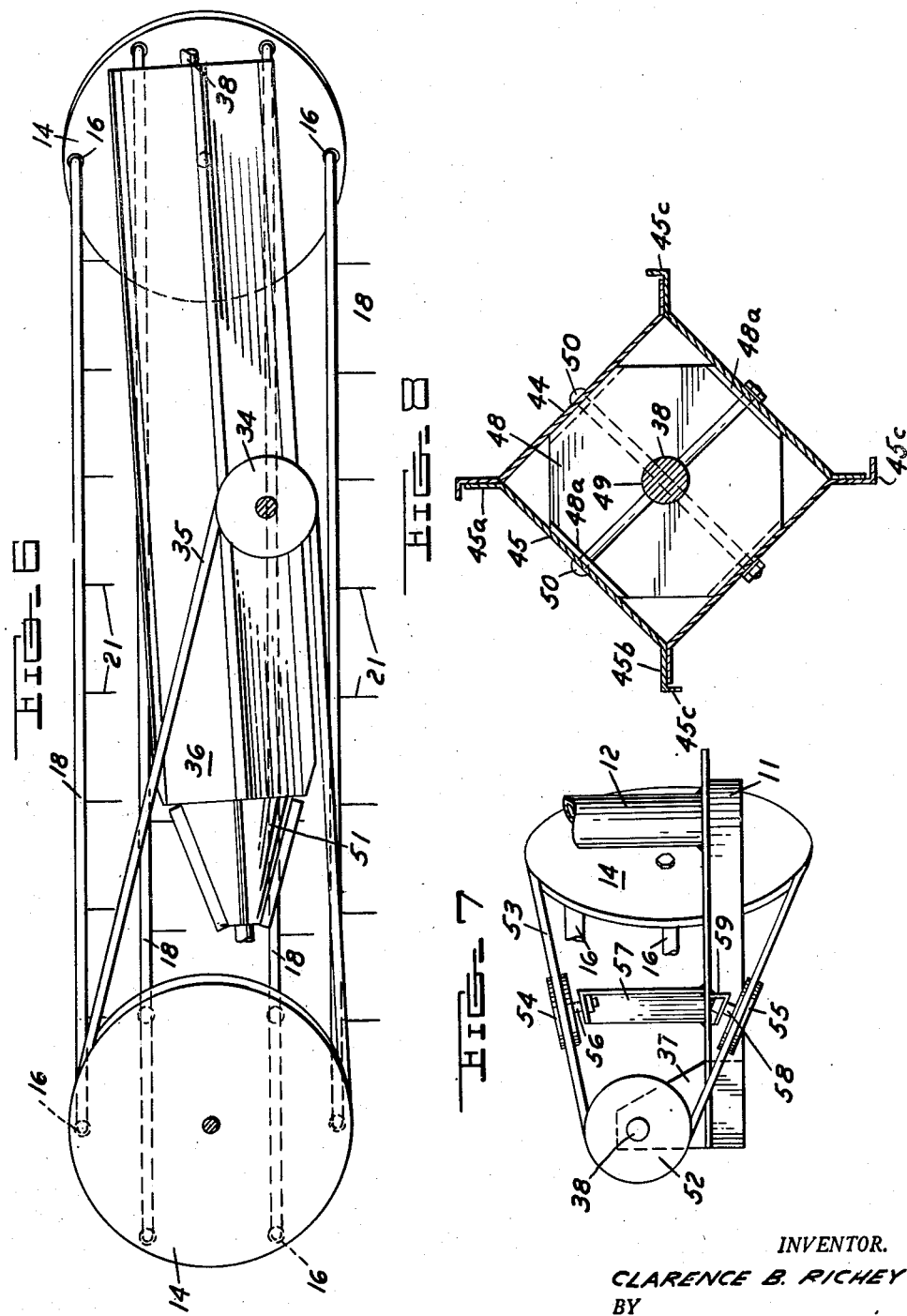

Patented June 16, 1953

2,641,895

UNITED STATES PATENT OFFICE 2,641,895

CROP STRIPPER FOR ROTARY RAKES

Clarence B. Richey, Royal Oak, Mich., assignor to Dearborn Motors Corporation, Highland Park, Mich., a corporation of Delaware Application December 31, 1949, Serial No. 136,305

5 Claims. (Cl. 56—377)

This invention relates to a crop stripper for crop handling implements and more particularly for side delivery rakes.

Side delivery rakes are widely used today for raking mown hay or grain from the swath and delivering it to one side in a windrow for curing and subsequent gathering. On the whole, side delivery rakes perform satisfactorily insofar as the raking is concerned. All of such rakes, however, have one major shortcoming in that the hay strippers heretofore utilized to prevent the hay from being carried around by the rake tooth bars have not been too effective, resulting in clogging and binding of the raking cylinder. Furthermore, the hay strippers heretofore used with side delivery rakes frequently interfered with the raking teeth on the rake tooth bars causing either such teeth or the stripper to be bent or broken, as well as raising the operating noise of the hay rake to an objectionable level.

Accordingly, it is an object of this invention to provide an improved crop stripper for a side delivery rake or similar implement, which efficiently strips the hay from the teeth of such rake without interference with the raking cylinder.

Another object of this invention is to provide a durable and efficient crop stripper for a crop gathering implement which is rotatably mounted on the implement and power driven in timed relationship to the rotation of the raking element of such implement.

A particular object of this invention is the provision of an economically manufacturable construction of a rotatable crop stripper.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a plan view of a side delivery rake incorporating the crop stripper of this invention.

Figure 2 is a fragmentary plan view similar to Figure 1 but enlarged to illustrate the various features in greater detail.

Figure 3 is a cross sectional view taken along the plane 3—3 of Figure 1.

Figure 4 is a cross sectional view taken along the plane 4—4 of Figure 1.

Figure 5 is a sectional view taken on the plane 5—5 of Figure 2.

Figure 6 is a schematic front view of the raking cylinder and the crop stripper showing the angular axis relationship of the crop stripper relative to the raking cylinder.

Figure 7 is an end view looking in the direction of the line 7—7 of Figure 2.

Figure 8 is an enlarged cross sectional view taken along the plane 8—8 of Figure 2.

As shown on the drawings:

Briefly this invention comprises a crop stripper of elongated box-like configuration rotatably mounted on a side delivery rake adjacent the rotating raking cylinder of such rake. The crop stripper is provided with circumferentially spaced, longitudinally extending radial vanes which pass closely adjacent the raking teeth of the raking cylinder to strip the crop from the raking teeth of the rake cylinder. A belt drive from the raking cylinder to the crop stripper effects rotation of such crop stripper and by suitable selection of pulleys, the crop stripper is rotated at a substantially higher rate of speed than the raking cylinder so that the vanes on the crop stripper will repeatedly pass adjacent to the raking teeth as they are carried past the stripper to insure that the crop may be efficiently and cleanly stripped therefrom.

There is shown in Figure 1 a side delivery rake 10 of the type with which the crop stripper of this invention may be utilized, comprising a generally oval shaped horizontal frame 11 of angle iron wich is open at the front side. The frame 11 is supported at its rear end by a plurality of wheels 65 pivotally mounted on brackets 11a.

An inverted U-shaped tubular raking cylinder support 12 is secured to frame 11 in upstanding relation and is also diagonally arranged on such frame. A raking cylinder or drum 13 is rotatably mounted between the vertical legs of support 12, and comprises a pair of spaced end wheels or discs 14 respectively mounted on stub axles 15 horizontally secured to the respective vertical ends of tubular support 12. Each axle 15 is angularly disposed with respect to the longitudinal axis of frame 11 so that the wheels 14 are in a non-parallel relationship to such axis but are parallel to one another as best shown in Figure 1. Both end wheels 14 are identical and each includes a belt groove portion 14a and a plurality of integral radially projecting, circumferentially spaced arms 17. A pivot hub 16 is formed on the end of each arm 17. A tubular rake tooth bar 18 having flattened ends 19 is pivotally secured to corresponding hubs 16 of wheels 14 by a bolt 20, such bars thus defining the raking cylinder 13. A plurality of conventional raking teeth 21 are secured along each bar 18 by bolt 22.

A pair of arcuately formed, forwardly converging carrying frame members 23 and 24 are secured to bottom frame 11 and vertical frame support 12 substantially transversely of such frames. Carrying member 23 is secured to the rear end of frame 11 by a plate 25 welded to the bottom end of brace 23 and in turn bolted to frame 11 by bolts 26. Carrying frame 23 curves upwardly over vertical support 12 and is suitably secured thereto and then extends downwardly to a point in advance of frame 11. Carrying frame 24 is of similar shape and is secured to the frame 11 and support frame 12 in a similar manner. The forward ends of each carrying frame 23 and 24 are of reduced section and a horizontal outwardly projecting pin 28 is secured within a transverse aperture (not shown) on the forward end of each such sections by welding. A strap 27 is mounted on each pin 28 and such straps are bent inwardly and upwardly and the top portions secured together to define an A-shaped frame best shown in Figure 3. The pins 28 and an aperture 27a in the top portions of strap 27 are utilized to permit connection of the implement to any tractor having the well-known three link implement hitch. A pair of braces 23a and 24a secured respectively at one end to carrying members 23 and 24 by bolts 23b and 24b are bent inwardly to join A-frame 27, such braces being secured thereto by a transverse bolt 27b to vertically support such A-frame.

A depending bracket 29 is transversely secured to the forward end of braces 23 and 24, preferably by welding. Bracket 29 supports a shaft 30 in a suitable bearing 31. Shaft 30 is connected to the power-take-off shaft 32 of the tractor (not shown) by a universal joint 33. A pulley 34 is provided near the rear end of shaft 30 and a belt 35 drivingly connects pulley 35 with the left hand end wheel 14 of raking cylinder 13. Thus the power of the tractor is utilized to rotate the raking cylinder 13.

Forwardly of raking cylinder 13 there is rotatably mounted on bottom frame 11 and vertical support 12 a crop stripping cylinder 36. A vertically disposed plate 37 is welded to the right end of frame 11 as viewed in Figures 1 and 2 and one end of a shaft 38 is horizontally journaled in such plate by a bearing 39. The other end of shaft 38 is journaled in a bearing 40 secured to the bottom of a vertical angle iron arm 41 by bolts 42. The top 41b of arm 41 is bent to extend over the top support 12 and is secured by bolts 41c to a bracket 41a welded to support 12. A third carrying member 43 provided near the right end of frame 10 is vertically mounted on frame 11 by a plate member 43a welded to the foot of carrying member 43 and secured to frame 11 by bolts 43b. Carrying member 43 is bent forwardly and is connected to bracket 41a by the bolts 41c utilized to secure arm 41 thereto. A bracket 11a is secured to the rear of carrying member 43 to pivotally support a wheel 65.

The crop stripping cylinder 36 may be conveniently fabricated as a sheet metal box 44 of built-up construction. Each side of the box 44 is constructed of a rectangular piece of sheet metal 45 having one longitudinal edge 45a bent outwardly at an obtuse angle with respect to the outer surface thereof. The other edge 45b of the sheet is similarly sloped, but, in addition, a right angled trailing edge 45c is provided on the extremity of such edge. When the various sides are placed together to form the box 44 in the manner indicated in Figure 8 the bent edges are contiguous and such junctures are spot welded together. The bent edges 45a and 45b, upon assembly, extend longitudinally of the box to define radially projecting vanes, while the trailing edges 45c extend tangentially of the rotational path of the stripping element.

A plurality of square plate-like spiders 48 are placed in spaced relationship inside of box 44. Each of such spiders is provided with diagonally opposed bent ears 48a which respectively engage the sides of box 44. An axial aperture 49 is provided in each spider 48 and shaft 38 passes through such apertures whereby the spiders 48 support shaft 38 axially of box 44. Bolts 50 disposed transversely between two opposed sides of box 44 likewise pass through respective ears 48a and shaft 38 to secure box 44 to shaft 38 and further to insure that box 44 retains its shape even when rapidly rotating. The extreme left end of stripper 36 as viewed in Figures 1 and 2 is of conical configuration as shown at 51. Substantially the same type of construction as described for box 44 is utilized in forming conical end portion 51. Inasmuch as the crop is moved towards the right by the raking cylinder, the conical portion 51 of stripper 36 eliminates surfaces that would tend to catch and wind up the crop.

On the end of shaft 38 which projects through bearing 39, there is mounted a pulley 52. A belt 53 connects pulley 52 with the belt groove 14a of right hand wheel 14, whereby pulley 52 is driven to effect rotation of crop stripper 36. Pulley 52 is of substantially smaller diameter than pulley groove 14a so that crop stripper 36 rotates faster than raking cylinder 13. Belt 53 is properly aligned with pulley 52 and with wheel 14 by a pair of opposed spaced idler pulleys 54 and 55. Idler pulley 54 is rotatably mounted on a shaft 56 supported by a vertically disposed bracket 57 welded to the top of frame 11, while idler pulley 55 is rotatably mounted on a shaft 58 supported by a depending bracket 59 welded to the underside of frame 11 opposite bracket 57. It should be noted that the described construction permits the two end wheels 14 of the raking cylinder to be of identical construction.

Crop stripper 36 is mounted adjacent the raking cylinder 13 so that the trailing edges 47 of vanes 46 just clear the raking teeth 21 as such stripper rotates. Thus, the shaft 38 of stripper 36 is substantially parallel to the axis of raking cylinder 13 when viewed in a vertical plane. The horizontal axis of crop stripper 36 however, diverges from the axis of the raking cylinder. Such displacement of the axis of stripper 36 provides more clearance at the right hand end of such stripper relative to the cylinder hence there will be no interference of the stripper with the crop deposited in a windrow at the right end thereof.

In the operation of the side delivery rake, the raking cylinder 13 is driven from the power-take-off shaft 32 through the medium of belt 35. Rotation of cylinder 13 rotates the right hand end wheel 14 thereby rotating the crop stripping cylinder 36. The raking cylinder 13 is rotated in such a direction that the raking bars 18 move upwardly past the crop stripping cylinder 36 while the stripping cylinder 36 is rotated so that trailing edges 45c pass downwardly along the raking teeth 21, whereby the crop is stripped from the raking cylinder and forced to the ground, Figure 6 best illustrating this relationship. It will be noted that the peripheries of the rotational paths of the raking cylinder 13 and the stripping element 36 substantially meet or coincide at a point on the discharge side of the teeth path, and the stripping element tangential surfaces 45c are substantially parallel to the teeth at this discharge point to effectively strip the crop from the teeth. Since the cylinder 13 and the stripping element 36 are travelling in opposite directions at the discharge point, the velocity of the raking teeth relative to the stripping element is increased and effective stripping action is further enhanced.

It will thus be apparent from the above description that there is here provided an unusually simple yet efficient crop stripper which does not interfere in any manner with the rapidly rotating tooth bars of the raking cylinder of a side delivery rake. The light but sturdy construction of the crop stripper permits such stripper to be rapidly rotated the same direction as that in which the cylinder is rotated, so that the rake teeth 21 and the element surfaces 45c are travelling in opposite directions at the discharge point to more effectively strip the crop from the raking cylinder without excessive consumption of power. This crop stripper is readily mounted on any side delivery rake and by utilizing identical end wheels for the raking cylinder equipped with pulley grooves the power drive therefore is very conveniently obtained from the tractor power-take-off shaft.

It will, of course, be understood that various details of construction may be varied through a wide range without departing from the principles of this invention and it is, therefore, not the purpose to limit the patent granted hereon otherwise than necessitated by the scope of the appended claims.

I claim:

1. In combination with a side delivery rake having a frame and a raking cylinder mounted in the frame for rotation about a horizontal axis, first drive means operatively connected to said cylinder for rotating said cylinder, an elongated stripping element mounted on said frame adjacent said raking cylinder for rotation about an axis laterally aligned with said axis of said cylinder, the rotational axis of said element being inclined upwardly relative to the axis of the raking cylinder in a direction toward the discharge end of the raking cylinder, second drive means driven by said first drive means and operatively connected to said element for rotating said element, and longitudinally extending radially projecting vanes on said element adapted to engage any portions of the crop clinging to said raking cylinder to strip such crop portions therefrom.

2. In a side delivery rake, a raking cylinder rotatable about a horizontal axis and having a plurality of circumferentially spaced raking teeth each movable in a rotational path and pivotally mounted so as to depend from the cylinder in a vertical plane during rotation of the cylinder, a crop stripping element rotatable about an axis generally parallel to the rotational axis of said cylinder, said stripping element having opposing radial projections terminating in end surfaces lying normal to said projections so as to extend tangentially to the rotational path of said projections, and drive means operatively connected to said cylinder and to said stripping element, respectively, for rotating said cylinder and said stripping element in the same direction with said teeth and said element end surfaces travelling in adjacent paths, the peripheries of said paths substantially meeting at a point on the discharge side of the teeth path.

3. In a side delivery rake, a raking cylinder rotatable about a horizontal axis and including a plurality of circumferentially and axially spaced raking teeth each movable in a rotational raking path, each of said teeth being pivoted to the cylinder to remain in a substantially upright position during rotation thereof and lying in a plane substantially tangential to the rotational path of the cylinder at a discharge point on said raking path, a crop stripping element rotatable about an axis substantially horizontally aligned with said teeth discharge point, said stripping element including radially projecting axially extending projections having portions lying normal thereto to provide outer surfaces defining the periphery of the rotational path of said stripping element, and drive means operatively connected to said cylinder and said stripping element, respectively, for rotating said cylinder and said stripping element in the same direction, with the rotational paths of said teeth and said tangential projection surfaces substantially coinciding at said discharge point, whereby said surfaces are effective to strip a crop from said teeth.

4. In a side delivery rake, a raking cylinder rotatable in a cylindroidal path and having vertically extending raking teeth movable through elliptical paths and each effective to elevate a mowed crop from the ground to a circumferentially spaced discharge point, a crop stripper rotatable about an axis radially spaced from and aligned with said discharge points and having axially extending radial projections movable through a cylindrical path to substantially contact each of said teeth at their respective discharge points, and drive means operatively connected to said cylinder and said stripper, respectively, for rotating said cylinder and said stripper so that said projections travel in a direction counter to and along the lengths of said teeth to strip the crop from said teeth at said discharge points.

5. In a side delivery rake having a frame, a raking cylinder rotatably mounted on the frame, drive means operatively connected to said cylinder for driving the same, and crop-engaging teeth carried by said cylinder, the improvements comprising a stripping element rotatably mounted on the frame adjacent said raking cylinder, a plurality of longitudinally extending, radially projecting vanes formed on said stripping element and having substantially tangentially disposed trailing edges arranged to pass in close proximity to a portion of the rotary path of said rake teeth, and drive means operatively connected to said stripping element to rotate the same in a direction in which said rake teeth and said stripping element vane edges travel in opposing directions to said portion of said rake teeth rotary path to strip off any portions of the crop clinging to said rake teeth.

CLARENCE B. RICHEY.

References Cited in the file of this patent

UNITED STATES PATENTS

| Number | Name | Date |
|---|---|---|
| 1,251,373 | Holeman | Dec. 25, 1917 |
| 1,371,410 | Clausen | Mar. 15, 1921 |
| 1,662,160 | Myrick | Mar. 13, 1928 |
| 2,388,212 | McElhoe et al. | Oct. 30, 1945 |